(12) United States Patent
Gorang et al.

(10) Patent No.: US 6,572,907 B1
(45) Date of Patent: Jun. 3, 2003

(54) METHOD FOR DRYING WALNUTS

(75) Inventors: Greg Gorang, Turlock, CA (US); Maris Lunt, Campbell, CA (US); Peter Mattson, Hillsborough, CA (US); Marianne Paloncy, Mill Valley, CA (US)

(73) Assignee: Diamond of California, Stockton, CA (US)

( * ) Notice: Subject to any disclaimer, the term of this patent is extended or adjusted under 35 U.S.C. 154(b) by 198 days.

(21) Appl. No.: 09/703,458

(22) Filed: Oct. 31, 2000

(51) Int. Cl.$^7$ ................................ A23L 1/36
(52) U.S. Cl. ................ 426/309; 426/456; 426/469; 426/632
(58) Field of Search ................ 426/632, 633, 426/392, 455, 456, 469, 309, 93, 310

(56) References Cited

U.S. PATENT DOCUMENTS

| | | | |
|---|---|---|---|
| 2,558,899 A | | 7/1951 | Green |
| 2,643,190 A | * | 6/1953 | Hageman .............. 426/632 |
| 3,457,087 A | | 7/1969 | Renner et al. |
| 4,085,230 A | | 4/1978 | Green |
| 4,113,889 A | | 9/1978 | Baxley |
| 4,160,044 A | | 7/1979 | Invernizzi et al. |
| RE30,651 E | * | 6/1981 | Green .............. 426/262 |
| 4,276,316 A | * | 6/1981 | Sharma .............. 426/466 |
| 4,362,759 A | * | 12/1982 | Harris .............. 426/486 |
| 4,738,860 A | * | 4/1988 | Lee .............. 426/482 |
| 4,938,987 A | * | 7/1990 | Gannis et al. .............. 426/417 |
| 5,391,389 A | * | 2/1995 | George et al. .............. 426/481 |
| 5,436,023 A | * | 7/1995 | Avera .............. 426/466 |
| 5,595,780 A | * | 1/1997 | Zook .............. 426/262 |
| 5,718,936 A | * | 2/1998 | Porter et al. .............. 426/289 |
| 5,738,894 A | * | 4/1998 | Prendiville .............. 426/481 |
| 5,762,988 A | * | 6/1998 | Schock et al. .............. 426/482 |
| 5,871,800 A | * | 2/1999 | George et al. .............. 426/481 |
| 5,939,119 A | * | 8/1999 | Cheng et al. .............. 426/302 |
| 6,042,863 A | * | 3/2000 | George et al. .............. 426/481 |
| 6,156,361 A | * | 12/2000 | Gilgen .............. 426/289 |
| 6,209,448 B1 | * | 4/2001 | Hagen .............. 99/568 |
| 6,284,300 B1 | * | 9/2001 | Prendiville et al. .............. 426/481 |

OTHER PUBLICATIONS

Woodroof, Jasper. 1973. Production Peanuts: Processing Products, $2^{nd}$ edition. The AVI Publishing Co., Inc., Westport, Ct, p. 197–225.*

J. Lurd, "Plant Polyphonols. I. The Polyphenolic Consitutents of the Pellicle of the Walnut (*Juglans regia*)," Journal of the American Chemical Society, 78, 3445 (1956).

"Walnut Blaching Study," Prepared For: Walnut Marketing Board and Ketchum Food Technology, Dec. 1988.

Rainer Perren, et al., "Investigations on the Hot Air Roasting of Nuts," 51st P.M.C.A Production Conference, 1997, pp. 77–81.

* cited by examiner

*Primary Examiner*—Carolyn Paden
(74) *Attorney, Agent, or Firm*—Coudert Brothers LLP

(57) ABSTRACT

A method for drying nuts that includes removing, acids, particularly tannins, and stopping enzymatic activity within the nut prior to drying provides a novel approach to processing nuts that has many useful characteristics. In one embodiment, walnuts are first blanched in water for 3 to 5 minutes to remove acids and stop enzymatic activity without causing the nut oils to react and are then reduced to a partially dehydrate state of 2% water. Nuts so prepared are dried without inducing rancidity producing reactions that normally occur when drying tannin-containing nuts and have less of a bitter taste associated with the tannins. Additionally, the nuts may be glazed to form a protective coating that inhibits oxidative reactions between the atmosphere and the nut, and which provides a convenient and tasty snack food.

25 Claims, 2 Drawing Sheets

METHOD FOR DRYING WALNUTS

FIELD OF THE INVENTION

This invention relates to the processing of foods and more particularly to improved methods of drying nuts.

BACKGROUND OF THE INVENTION

Processed nuts are heated for a variety of reasons. Nuts are sometimes heated with boiling water (blanched) to promote easy removal of the shells. Heating of the nuts by blanching is usually performed at or above the boiling temperature of water for times approaching an hour. Nuts are sometimes dried to provide increased shelf life, to produce a readily edible food product, or to prepare the nuts for further cooking steps. Methods of drying include roasting, such as where the nut is heated in oil to temperatures from about 250 to 375 F.

While heating has many beneficial uses, it may also produce undesirable side effects including: discoloration; unacceptable changes in texture or consistency; rancidity or other reactions that shorten shelf life; and driving tannins or other acids from the shell into the nutmeat during blanching. Of particular concern here are heat induced rancidity and shortened shelf life that often occur in acid-containing nuts.

Specifically, the drying of some types of nuts, such as walnuts that contain high levels of tannins or other acids, is problematic (L. Jurd, Journal of the American Chemical Society, volume 78, page 3445, 1956) due to enzymatic activity and reactions between acids and oils within the nut. For example, roasting walnuts produces a nut that either quickly becomes rancid or that has an unacceptable shelf life. As a result roasted walnuts are not widely available.

Roasting is one well-known method of drying foods. For example, peanuts and nuts such as almonds, cashews, pecans and macadamias are cooked in oil at temperatures above the boiling point of water, sometimes in the presence of seasonings such as salt. Unfortunately temperatures significantly above the boiling point of water can induce reactions between nut oils and acids, tannin in particular, resulting in a rancid nut. Nuts with high fatty acid content include: walnuts, cashews, pecans and macadamias. Even in nuts without high acid content, roasting can introduce surface blemishes. This problem has been addressed, for example, by Renner et al. (U.S. Pat. No. 3,457,087) by quenching the nuts to a lower temperature of about 130 F. While the method of Renner et al. addresses the appearance of the nuts, the problems associated with heating tannin-containing nuts remain.

Blanching has been used as a method of shelling nuts; see for example U.S. Pat. No. 2,558,899 to Green. Nuts are exposed to water at or above its boiling point to soften the shells prior to removal. Green noted that during blanching tannins are removed from the shells, and recommended limiting the blanching time to prevent tannins from migrating from the blanching water into the nutmeat. If further processing of the nut includes roasting, migration of tanning from the shell to the nuts may result in the previously noted rancidity problems.

The problems with heating acid-containing nuts may be reduced by removing the tannins from the nut. In a patent related to the removal of tannins from nutmeats, Invernizzi et al. (U.S. Pat. No. 4,160,044) disclose repeated exposure of nuts to demineralized water, followed by drying the nuts. Specifically, Invernizzi et al. disclose removing tannins that might produce discoloration of other food products, such as processed cheeses, that are in contact with the nuts. The process includes removing tannins by three separate, low temperature, demineralized immersion baths of nutmeats over a period of 22 to 24 hours. While this process apparently removes the tannins, and thus could be used prior to roasting, it is a complicated and time-consuming process.

While these methods address some of the issues resulting from heating nuts, none of these methods addresses all of the problems encountered in the commercial-scale drying of nuts having high concentrations of tannic acid and high concentrations of lipid or fatty acids. The application of the previously described methods to walnuts, for example, results in walnuts that are rancid, have unacceptably short shelf-life (days or months), must be refrigerated or otherwise exposed to other hard to control environments, or must be subjected to a long and complicated process.

Walnut growers, in particular, find that the difficulties involved in commercially roasting walnuts is a hindrance to their sale as a prepared food product or as a snack food. Thus, for example, while roasted walnuts can be eaten soon after roasting or can be refrigerated for later use, they are not found in large quantity, commercially available snack foods, such as in roasted nut mixtures. In view of the above-mentioned limitations in the food preparation arts, there is a need for a method of processing high fatty acid containing and tannic acid containing nuts, such as walnuts in particular, which results in a dry nut that can be stored or packaged for later use or for snack food consumption.

BRIEF SUMMARY OF THE INVENTION

It is one aspect of the present invention to provide a method of processing nuts to drive off a substantial fraction of high fatty acids from the nuts, followed by drying. The reduction of the acid concentration in the nut prior to drying allows for a greater range of drying conditions. The process of the present invention is particularly useful, though not limited to, nuts having high fatty acid content and tannic acid. In addition, the process of the present invention is less time consuming, than other processes that remove tannins from food products, is compatible with commercial nut operations, and removes tannins that may cause a bitter taste. One embodiment of the process includes blanching the nuts to remove acids therein and drying the nuts to a partially dehydrated state.

It is another aspect of the invention to provide a method whereby shelled nuts are heated to stop enzymatic activity and removed acids from nuts without causing the nut oils to react and to reduce the nuts to a partially dehydrate state. In one embodiment, nuts are heated less than 5 minutes in water at a temperature of less than 280 F. to stop enzymatic activity and remove acids, and are then dried at a temperature of less than 280 F. until the water content becomes 5% or less, preferably 2% or less.

It is another aspect of the present process to protect the dehydrated nuts from further reactions by coating the nuts. In one embodiment, the dehydrated nuts are coated with a glaze to inhibit reactions of the nut with the atmosphere. The glazed nut is then stored in a container that is substantially free of oxygen and light.

It is yet another aspect of the present invention to produce dried nuts having reduced quantities of tannic acid a process that is rapid and is compatible with current commercial nut processes.

All publications and patents cited herein are hereby incorporated by reference in their entirety for all purposes.

Additional objects, advantages, aspects and features of the present invention will become apparent from the description of the invention, set forth below, which should be taken in conjunction with the accompanying drawings, a brief description of which follows.

BRIEF DESCRIPTION OF THE DRAWINGS

The invention will be better understood by reference to the following: figures in which.

Figure 1:
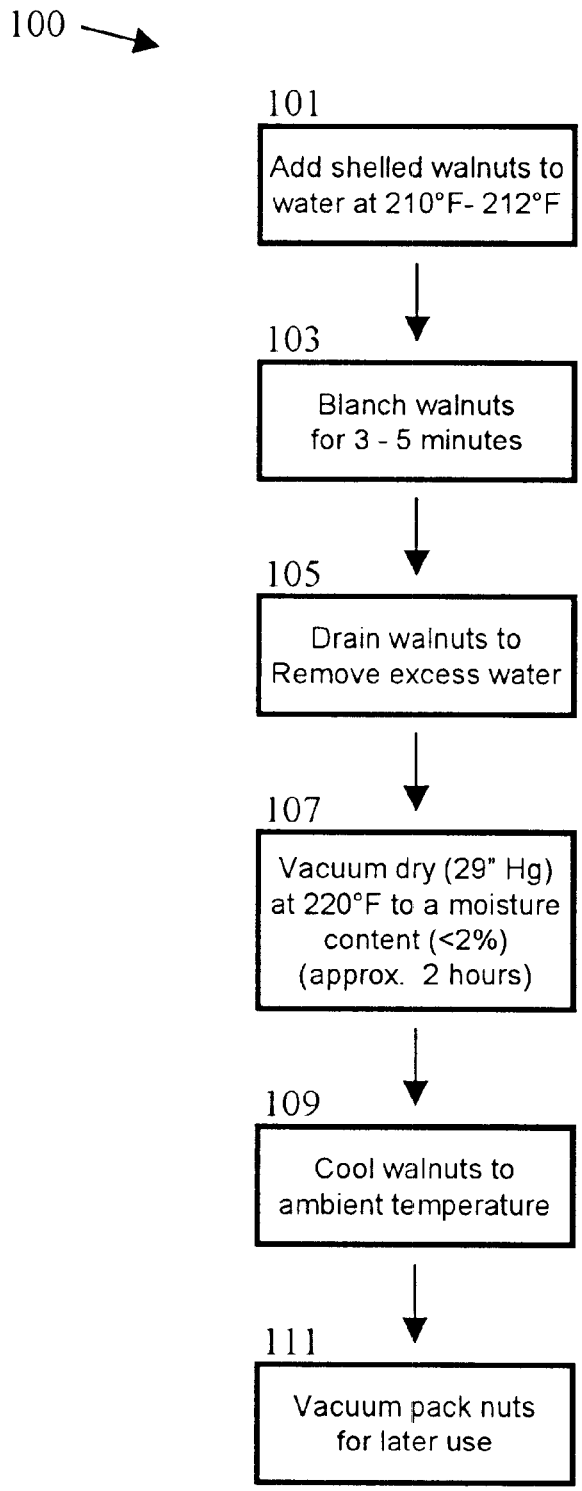
FIG. 1 is a process flowchart for blanching walnuts.

Reference symbols are used in the Figures to indicate certain components, aspects or features shown therein. Reference symbols common to more than one Figure indicate like components, aspects or features shown therein. The reference symbols used herein are not to be confused with any reference symbols used in the items that have been incorporated herein by reference.

DETAILED DESCRIPTION OF THE INVENTION

The present invention is directed to a method of drying nuts that results in increased shelf life. Drying of nuts has many uses, such as increasing the shelf life by removing water that is needed by bacteria, yeasts, molds and other organisms from growing and spoiling the food, and by slowing down the action of enzymes that cause rancidity. The drying temperature must be controlled to prevent the food from cooking or from promoting enzymatic reactions. For example, it is known that rancidity may result from maintaining a nut having fatty acids and oils at high temperatures for a sufficient amount of time. Specifically, the conditions necessary for roasting, blanching, and other heated conditions are sufficient to cause rancidity in many fatty acid containing nuts. The present invention overcomes the limitations of the prior art by removing tannins from the nuts at time-temperature conditions that do not cause reactions within the nuts. The method is particularly useful, though not limited to, nuts having high fatty acid content. The process includes the drying of nuts followed by protecting the nuts from further spoiling reactions. The invention will now be described in terms of methods for drying and storing walnuts. It will be understood by those skilled in the art that the invention is applicable to the processing of other nuts.

In general, the method of the present invention includes processing shelled nuts by exposing them to blanching conditions sufficient to stop enzymatic activity and drive off tannins without causing nut oils to react, followed by drying the nuts. Additionally, a protective coating glaze can be applied to the dried nuts to prevent or inhibit oxidative reactions and to produce a snack food product. Blanching of shelled, as opposed to unshelled, nuts allows for faster and more predictable heating, and also allows tannins and phenolic compounds to be more easily transported away from the nuts by the blanching liquid. In addition, many shells contain tannins, and the removal of the shells prior to blanching prevents the shell tannins from being introduced to the nut interior during blanching.

According to the present invention, the goals of blanching include heating the bulk of the nuts to a temperature and for a time sufficient to drive off tannic acids and transport the acids away from the nuts, and to stop enzymatic activity within the nut. The blanching conditions (blanching time and temperature) depend on the composition and size of the nuts. In general a larger nut requires a longer blanching time to achieve the above-mentioned goals. For blanching in water at atmospheric pressure for 4 to 5 minutes is preferred for whole walnuts, while blanching times of 3 to 4 minutes is preferred for half walnuts. Blanching conditions may be determined by processing nuts until the bitter taste associated with tannin has been removed from the nuts. The blanching conditions should be limited to reduce reactions within the oils or other parts on the nuts. It is generally known in the art that at temperatures above 280 F. nuts will start to cook or burn, and thus the drying temperature should not exceed this temperature for any appreciable period of time.

In addition, the blanching conditions may be achieved at other temperatures and/or times. For example, a shorter blanching time could be obtained using a pressure cooker to increase the blanching temperature, or to process the nuts at a higher temperature that is below the pressurized boiling temperature. Alternatively, other liquids capable of heating the nuts and carrying away the tannins could be used in place of water.

Following blanching, the nuts are drained of excess water, for example by gravity or centrifuge assisted draining. The nuts are then dried to a partially dehydrated state to remove the remainder of the water. It is preferred that the nuts be dried soon after draining. As an example, the drained nuts can be stored at cool, dry conditions and/or under vacuum for approximately one day before drying.

A partially dehydrated state promotes shelf life by reducing reaction rates and provides for better control of glazes or other coatings applied to the nut, as described subsequently. It is preferred that the moisture content be less than 5% to enhance the shelf life, and that a lower moisture content, for example less than 2% water, be maintained to prevent any applied glazes from becoming tacky. The drying time is dependent on many parameters, including but not limited to the nut size, oven design, air circulation, and the drying history. In addition, if the moisture content is too high, then drying may be continued until a required content is achieved. In practice, the drying time is determined by testing the water content of dried nuts.

Drying can be more quickly carried out temperatures closer to the 280 F. temperature at which cooking or burning occurs, and the moisture content of the nuts can be reduced to levels low enough to provide nuts with acceptable texture and to prevent water-dependent reactions at a later time. There are many combinations of pressure, temperature and other drying parameters that can be used to partially dehydrate the nuts without cooking them. Thus, for example, a moisture content of less than 2% may be achieved by vacuum drying at a pressure of 29" Hg, at a temperature of less than about 220 F. for about 2 hours. Alternative drying techniques include drying at higher or lower pressures and/or temperatures and the use of forced-air-drying if applicable for the environmental conditions. Thus one alternative is to dry with atmospheric, recirculating air at a temperature of 270 F. for less for 2 hours.

Following drying, the nuts are cooled to room temperature, vacuum packed and stored for later use, preferably within one week and under conditions where oxidative reactions are not promoted. After the nuts are dried, further processing can provide for an increased shelf life and produce a snack food product for mass consumption. Glazing, for example, is one way of producing a commercially viable snack food from dried walnuts. While glazing process temperatures would cause raw walnuts to become rancid, nuts dried according to the method of the present invention can withstand higher temperatures and can be glazed. Glazing provides increased shelf life by coating the nuts to protect them from oxidative reactions and from reabsorbing moisture. The glazed nuts and any additional seasoning produces an edible snack food from the nuts. The glazed nuts are then packaged in a container that prevents or slows down oxidative reactions. Examples of such a container are a light-free, hermetically sealed containers, including but not limited to cans and bulk packaging containers.

Specific Embodiment

Figure 2:
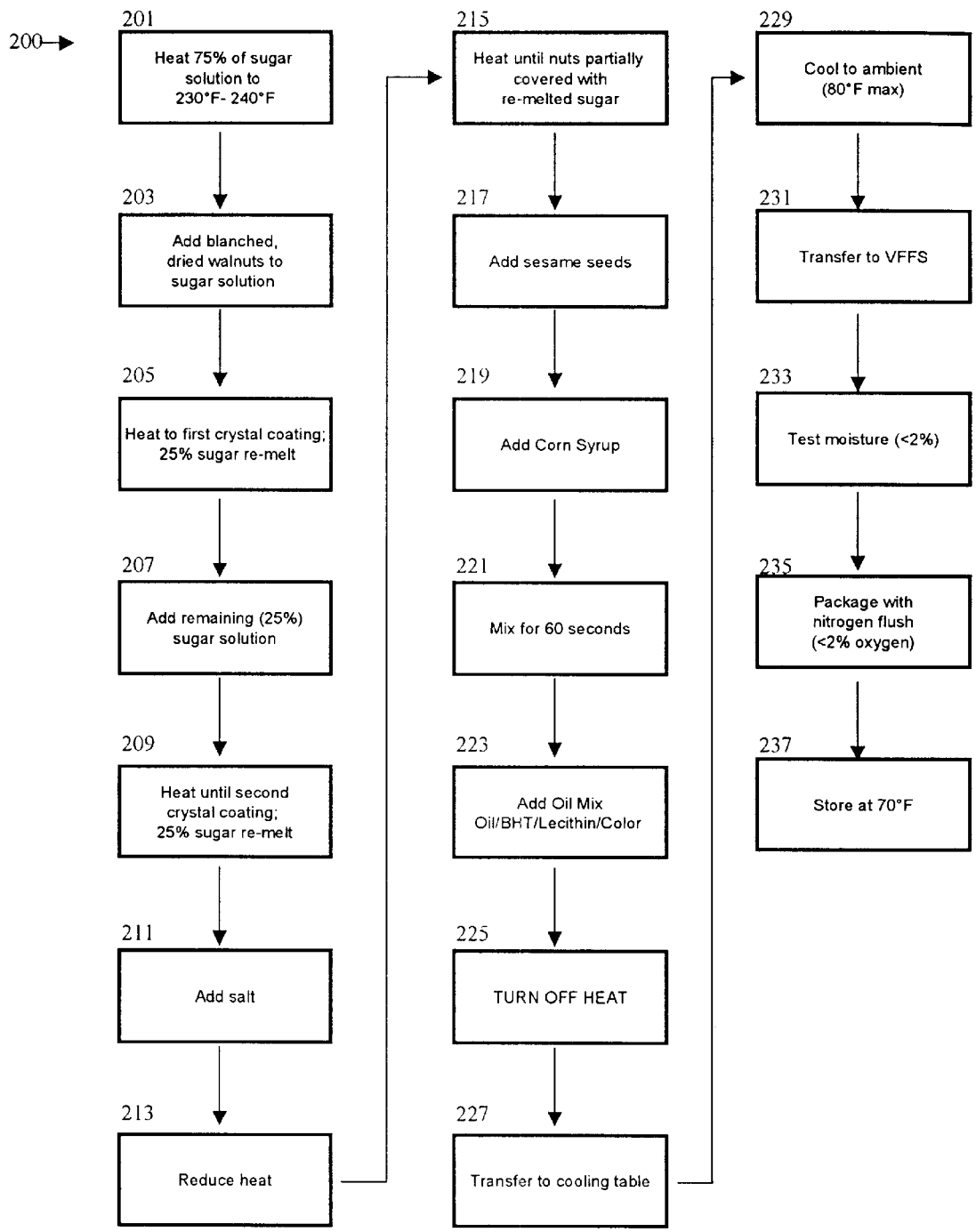
FIG. 2 is a process flowchart for glazing walnuts.

A specific embodiment of a blanching and glazing process is presented in FIGS. 1 and 2, respectively. The following discussion provides one specific embodiment of the present invention, and is not meant to limit the scope of the invention. FIG. 1 shows a blanching process flowchart 100 for blanching nuts, to remove tannins and stop enzymatic activity in walnuts according to the present invention. The blanching process 100 is shown as a series of blocks 101–111 that include various process steps including subjecting walnuts to boiling water, followed by drying the nuts to low moisture content and storing them for further use. Blanching begins by adding shelled walnuts to atmospheric boiling water at 210 F. to 212 F. (block 101). The nuts are maintained at approximately boiling water temperature for 3 to 5 minutes, depending on the size of the nuts (block 103), as noted previously. The blanched nuts are then drained of excess water (block 105), for example by gravity or centrifuge assisted draining, and dried to a partially dehydrated state under vacuum to remove the remainder of the water (block 107). The nuts should be transferred from draining (block 105) to vacuum drying (block 107) either soon after draining, or should be stored in a cool, dry environment between these steps. A moisture content of less than 2% is achieved with a vacuum drying temperature of less than about 220 F. for a time of 2 hours and a pressure of 29" Hg. Variations of this embodiment include higher or lower pressures and/or temperatures and the use of forced-air-drying if applicable for the environmental conditions. Thus an alternative embodiment is the use of atmospheric drying with circulating air may be performed a temperature of 270 F. or less for 2 hours.

The nuts are then cooled to room temperature (block 109), vacuum packed (block 111) and stored for later use. The nuts may be stored under conditions where oxidative reactions are controlled, such as under refrigeration or at a temperature of approximately 70 F. for less one week.

The blanched nuts processed according to process 100 can either be consumed as is, processed further, or packaged to prevent an increase in moisture or exposure to oxidation inducing light. Examples of packaging include partially evacuated containers to prevent an intake of oxygen or water, an/or refrigeration of the nuts to slow down any rancidity reactions. As described subsequently, the blanched nuts can be provided with a protective, edible coating to produce a snack food.

The present invention includes a process for protecting the blanched nuts as shown in the glaze process flowchart 200 of FIG. 2. The inventive process provides the blanched nuts with a tasty and crunchy coating suitable for a snack food, while protecting the nuts from further oxidative reactions. The glazing process flowchart 200 presents a series of process steps 201–237 for glazing nuts in general, and the previously blanched nuts in particular, in which the nuts are heated in syrup to uniformly coat the nuts with a protective sugar-based coating. Glazing is accomplished by increasing the sugar content of the syrup with time, while decreasing the amount of heat being applied to the mixture. In addition to the sugar, salt and sesame seeds are added for taste, and preservatives are added to provide increased shelf life. The nuts are glazed by heating the nuts in an 80% sugar solution in two stages over approximately 10 to 15 minutes. Acceptable levels of coating are produced with a nut to sugar weight ratio of about 4 or 5 pounds of nuts to each pound of sugar.

The glazing process 200 of the present invention differs from some conventional glazing processes that heat the nuts prior to adding sugar or syrup. The glazing process 200 begins by heating 75% of the sugar solution to 230 F. to 240 F. in a cooking apparatus such as a Savage cooker (block 201) (manufactured by the Savage Bros. Co., 1125 Lunt Avenue, Elk Grove Village, Ill. 60007-5023 U.S.A.) or other apparatus for mixing while heating. The blanched, dried walnuts, as those of blanching process 100 are added to the heated sugar solution (block 203). As the water is driven from the sugar solution, the sugar crystallizes on the walnuts and eventually re-melts. Heating proceeds until the walnuts are covered by approximately 25% re-melted sugar (block 205), as determined by a visual inspection of the walnuts. The remaining 25% of the sugar solution is added to the heated walnut/syrup mixture (block 207), and heating continues until the nuts are again covered by 25% re-melted sugar (block 209).

At this point salt (2 weight percent of blanched nuts) is added as seasoning (block 211), the heat is reduced (block 213) to prevent the walnuts getting too hot, and heating is continued until the nuts are partially covered with re-melted sugar (block 215). Sesame seeds (5 weight percent of blanched nuts) are added (block 217) for seasoning and corn syrup (20 weight percent of blanched nuts) is added (block 219) to produce a glossy coating to the glaze. Heating while mixing continues for approximately 60 seconds (block 221), at which time an oil mixture containing the preservative and antioxidant butylated hydroxytoluene (BHT), the release agent Lecithin and coloring are added (block 223), and the heat is turned off (block 225). The oil mixture of block 223 can include one or more hydrogenated vegetable oils, not limited to soybean, canola or cottonseed. Alternatively the oil mixture may contain other preservatives, antioxidants or release agents.

The coated nuts are then transferred to a cooling table (block 227), where they are cooled to ambient temperature (block 229). It is preferred that the nuts be cooled to 80 F., and then transferred under a modified atmosphere, preferable reduced in oxygen content, to a vertical form fill and seal (VFFS) bulk packaging machine 231. Alternatively the packaging machine could be a horizontal form fill and seal machine. The glazed nuts are then tested for moisture (block 223) as a quality control check. It has been found that it is important to keep the nut moisture content at a few percent, such as below approximately 2%, to prevent the glazing from becoming tacky. Nuts having a moisture content that may result in a tacky glaze may be considered unacceptable for sale. Acceptable nut packages are flushed with nitrogen to reduce the oxygen content below 2% (block 235) to reduce oxidation, and are then stored at 70 F. (block 237). In addition to being stored in a substantially hermetically sealed container to keep oxygen and moisture out, the container should also be light free to eliminate light-induced chemical reactions.

The glazing process 200 can be modified to produce similar results. For example, the quantities of seasoning may vary greatly to suit various tastes, and other seasonings as is known in the art may be added or not added to the nuts, or may be added in an order different from that indicated in the glazing process flowchart 200. In addition, the process may be modified or controlled through the concentration of the syrup. For example, the number of re-melting steps depends, among other conditions, on the concentration of the syrup. The disclosed process has three re-melting steps (blocks 205, 209, and 215) with a syrup concentration of 80%. It is known in the art that increasing the syrup concentration can reduce the number of re-melting steps.

It is to be understood that while the invention has been described above in conjunction with preferred specific embodiments, the description and examples are intended to illustrate and not limit the scope of the invention, which is defined by the scope of the appended claims.

It is claimed:

1. A method of processing nuts comprising:
   heating shelled nuts in water sufficient to stop enzymatic activity and drive off acids without causing the nut oils to react; and
   drying the shelled nuts to a partially dehydrated state having a water content of approximately 5% or less by weight.

2. The method of claim 1, wherein said heating is for approximately 3 minutes to approximately 5 minutes.

3. The method of claim 1, wherein said water is at a temperature of less than 280 F.

4. The method of claim 1, wherein said water is boiling water at atmospheric pressure, and wherein said heating is for less than approximately 5 minutes.

5. The method of claim 1, further comprising centrifuge drying the nuts prior to drying.

6. The method of claim 1, wherein said partially dehydrated state has a water content of approximately 1% or mare by weight.

7. The method of claim 6, wherein said drying is at a temperature of less than about 280 F.

8. The method of claim 7, wherein said drying is at a temperature of about 220 F.

9. The method of claim 1, further comprising coating the nuts with a glaze.

10. The method of claim 9, further comprising heating a sugar syrup to from approximately 230 F. to approximately 240 F.

11. The method of claim 9, further comprising packing the nuts in an hermetically sealed container.

12. The method of claim 9, further comprising packing the nuts in a substantially light-free container.

13. The method of claim 1, wherein said nuts are walnuts, cashews, pecans or macadamias.

14. A method of processing nuts comprising:
    heating shelled nuts in water sufficient to stop enzymatic activity and drive off acids without causing the nut oils to react;
    drying the shelled nuts to a partially dehydrated state having a water content of approximately 5% or less by weight; and
    coating the nuts with a glaze.

15. The method of claim 14, wherein said heating is for approximately 3 minutes to approximately 5 minutes.

16. The method of claim 14, wherein said water is at a temperature of less than 280 F.

17. The method of claim 14, wherein said water is boiling water at atmospheric pressure, and wherein said heating is for less than approximately 5 minutes.

18. The method of claim 14, further comprising centrifuge drying the nuts prior to drying.

19. The method of claim 14, wherein said partially dehydrated state has a water content of approximately 1% or more by weight.

20. The method of claim 19, wherein said drying is at a temperature of less than about 280 F.

21. The method of claim 20, wherein said drying is at a temperature of about 220 F.

22. The method of claim 14, further comprising forming said glaze by heating a sugar syrup to from approximately 230 F. to approximately 240 F.

23. The method of claim 14, further comprising packing the nuts in a hermetically sealed container.

24. The method of claim 14, further comprising packing the nuts in a substantially light-free container.

25. The method of claim 14, wherein said nuts are walnuts, cashews, pecans or macadamias.

* * * * *